May 15, 1956  G. J. O. WELIN-BERGER  2,745,477
STOVES, PARTICULARLY FOR THE HEATING OF MOTOR VEHICLES
Filed April 4, 1951  3 Sheets-Sheet 1

INVENTOR
Guy John Olof Welin-Berger
BY
ATTORNEY

May 15, 1956     G. J. O. WELIN-BERGER     2,745,477
STOVES, PARTICULARLY FOR THE HEATING OF MOTOR VEHICLES
Filed April 4, 1951     3 Sheets-Sheet 2

INVENTOR
Guy John Olof Welin-Berger

BY

ATTORNEY

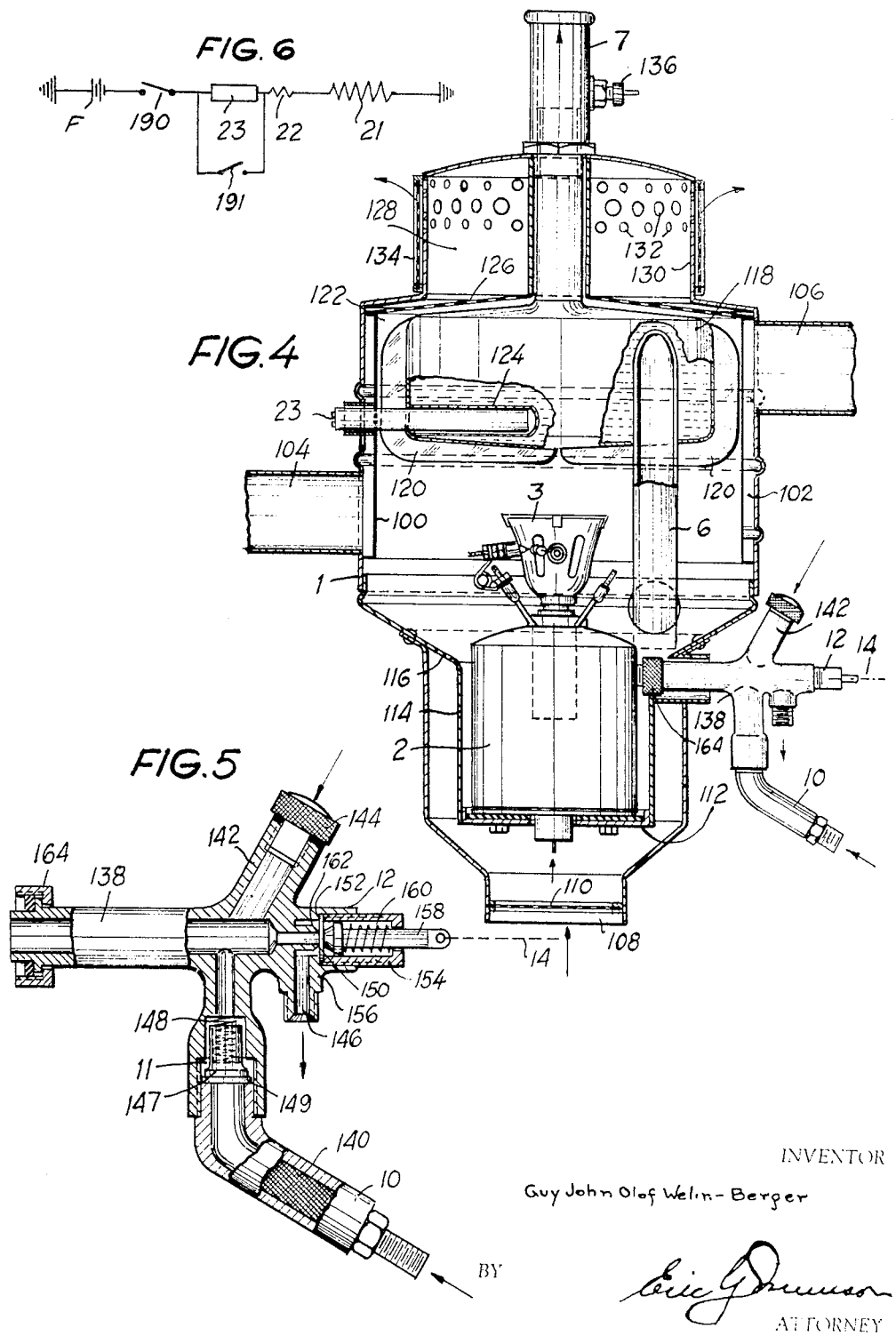

United States Patent Office 2,745,477
Patented May 15, 1956

2,745,477

STOVES, PARTICULARLY FOR THE HEATING OF MOTOR VEHICLES

Guy John Olof Welin-Berger, Stockholm, Sweden

Application April 4, 1951, Serial No. 219,206

Claims priority, application Sweden May 24, 1950

6 Claims. (Cl. 158—36)

The present invention refers to a stove heated with liquid fuel and intended particularly for the heating of motor vehicles, especially for the heating of the cooling water or cooling liquid of the driving engine, to facilitate starting of the engine, when the vehicle is used in winter time.

One object of the present invention is to provide a stove of the type in consideration, which is automatically ignited and extinguished in dependence on the external temperature or the temperature of a medium heated by the burner, or which is extinguished, when a certain quantity of fuel has been consumed.

Another object of the invention is to provide the simplest possible auxiliary means for automatic ignition and extinction of a heating device for motor vehicles.

A further object of the invention is to provide an automatically acting heating device for the cooling water for internal combustion engines permitting of being started and stopped manually independently of the automatically acting means.

The invention also aims at providing a cooling liquid heater, which is operated by means of a burner while permitting simultaneously also of being used for the heating of air, which may be supplied to the passenger space of a motor vehicle for the heating of the same, or which may be conveyed to various parts of the motor requiring heating in very cold weather, such parts being, for instance, the change speed gear box or the oil basin.

Figure 1:
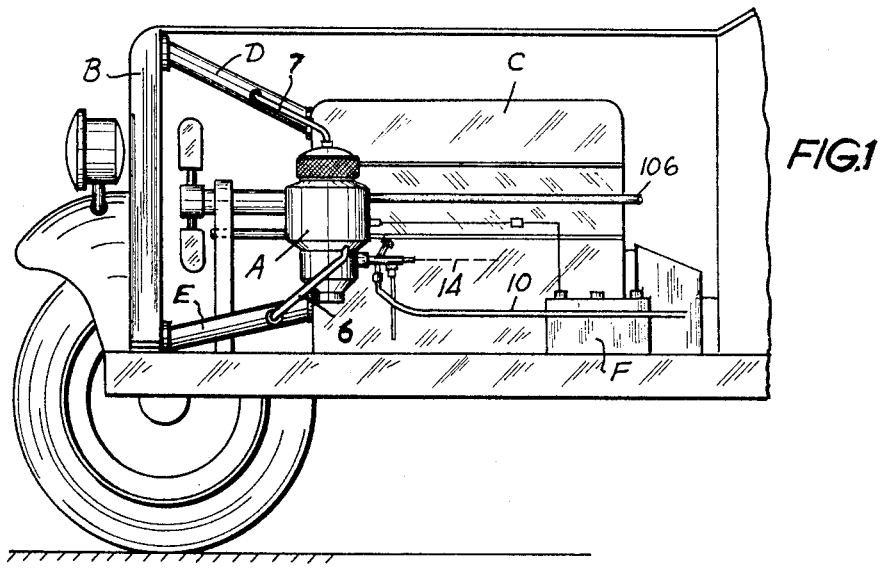
Figure 3:
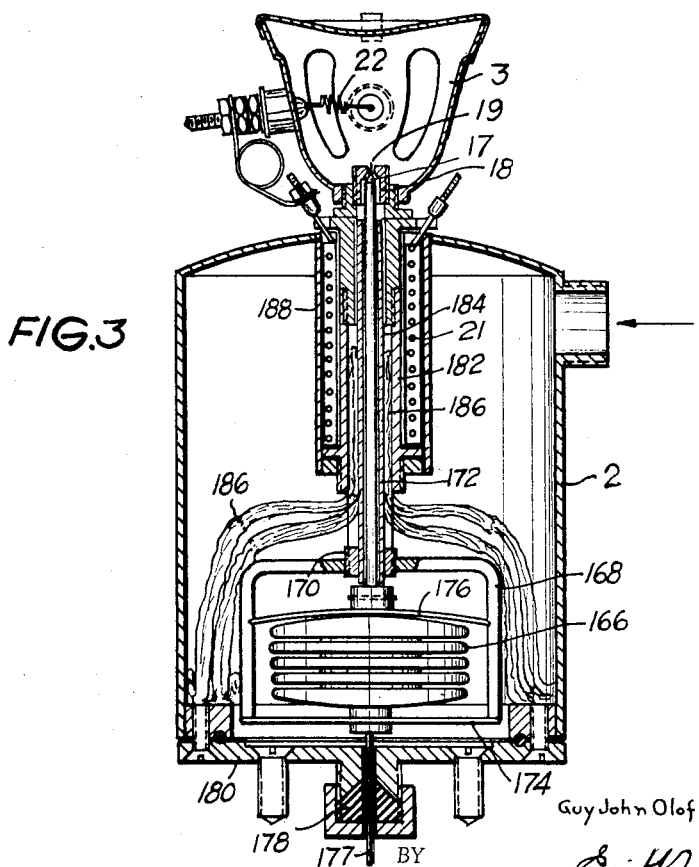
Figure 2:
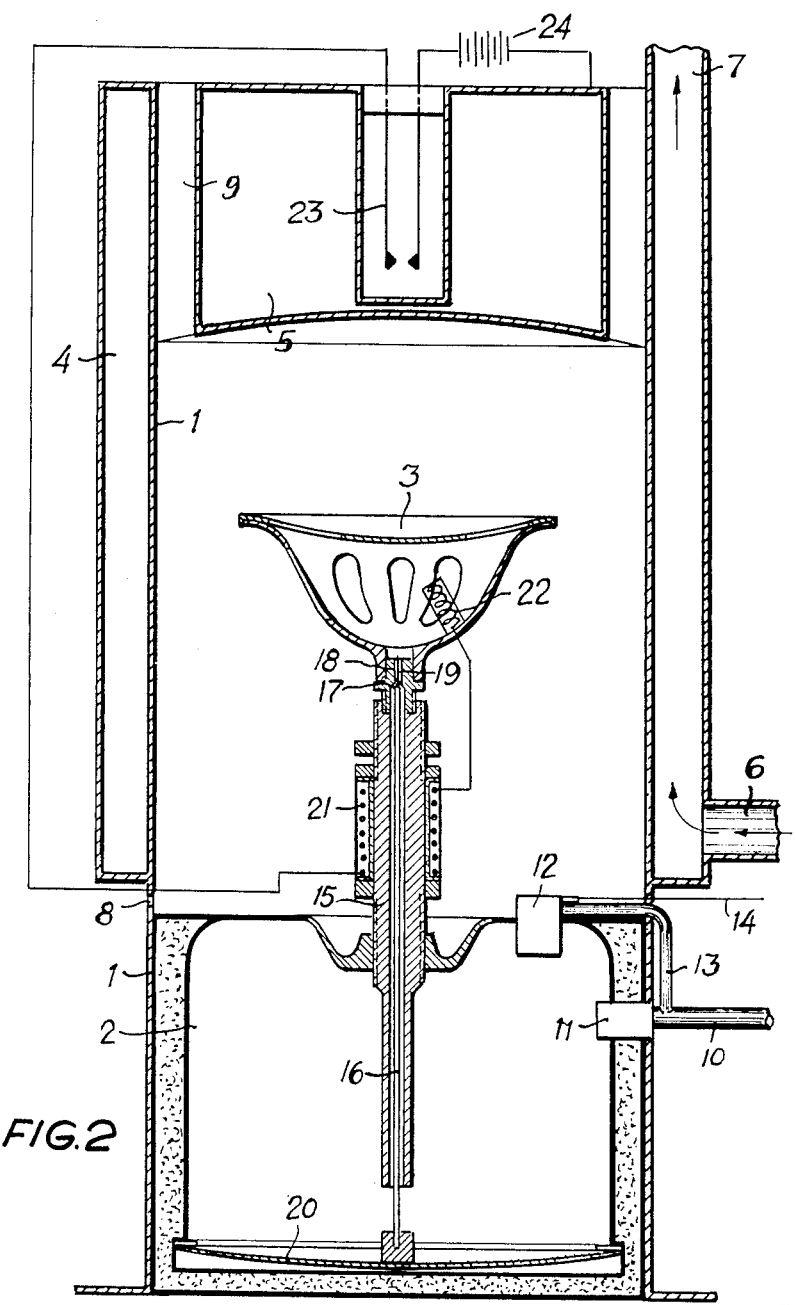

Various details of a stove made according to the invention for the heating of motor vehicles are represented in varying forms of embodiment in the accompanying drawings. Fig. 1 shows the front portion of a motor car with a stove according to the invention fitted therein. Fig. 2 is a vertical section illustrating a form of embodiment of the stove by way of diagrammatic representation. Fig. 3 is a vertical section of a further embodiment. Fig. 4 is a vertical section and shows the burner pertaining to the latter embodiment more in detail. Fig. 5 shows a valve device substantially in section and to a larger scale, said valve device pertaining to the apparatus shown in Fig. 4. Fig. 6 shows an electric wiring diagram.

In the assembly shown in Fig. 1, A designates the stove proper, B the radiator of the motor vehicle, C the engine thereof, D a conduit for warm water extending from the cooling jacket of the engine to the radiator B, and E a conduit for cold water extending from the radiator B to the cooling jacket. F denotes the electric storage battery of the vehicle.

In the stove according to the embodiment shown in Fig. 2, a heat-insulated fuel container 2 and a gas burner 3 are arranged within an approximately cylindrical casing 1. The casing 1 is surrounded by a water jacket 4 and has an upper water space 5 communicating therewith. At the junctions 6 and 7 the water jacket is intended to be connected to the cooling water system of the motor vehicle in which the stove is arranged; 8 designates the air intake of the casing for the supply of combustion air to the burner 3, which is entirely enclosed within the casing, and 9 denotes channels extending through the water space 5 and forming outlets for the waste gases.

Liquid fuel, generally petrol, from the fuel tank of the vehicle is intended to be supplied to the fuel container 2 of the stove through a conduit 10. A non-return valve 11 at the inlet of this conduit in the container serves to prevent any return flow at a pressure above atmospheric within the container 2. A second valve 12 on the container is normally closed and opens, should the pressure become too high. The outlet conduit 13 from the latter valve is connected to the conduit 10. The valve 12 may also be opened manually by means of a wire 14, the outer end of which is accessible for instance at the driver's seat. If desired, the valves 11 and 12 may be combined into a single valve.

The burner 3 is carried by a vertical riser tube 15 which conveys fuel to the burner, said riser tube depending with the lower end thereof to the proximity of the bottom of the container 2. This tube serves as a vaporizer for the fuel and is made thick-walled at the top, and has a large surface contacting with the burner 3 in order to readily conduct heat from the latter. Arranged within the tube 15 is a displaceable rod 16, the upper conically shaped end of which forms the movable valve member of a cut-off valve 17, which is arranged in immediate connection to the burner nozzle 18. A cleaning needle 19 is secured to the extreme upper end of the rod 16. The lower end of the rod 16 is attached to the center of a resilient diaphragm 20, which forms an inner bottom of the fuel container, the resiliency of the diaphragm acting upwardly so as to tend to close the valve 17. In the position shown, which corresponds to the stove when ignited, the diaphragm is kept depressed by the gas pressure prevailing in the container.

An electric heating helix 21 which is inserted into a steatite member, for example, is thrust onto and secured to the riser tube 15. Furthermore, the burner 3 has arranged thereon a glow igniter 22. The heating helix and the glow igniter are connected in series mutually and with a thermostat 23 provided in the water space 5, and are adapted to be connected to the electric storage battery 24 of the vehicle.

The mode of operation is as follows: When the temperature falls below a certain predetermined temperature of the cooling water, the thermostat 23 closes its contacts, so that the heating helix 21 and the glow igniter 22 receive current and commence to become heated. To begin with, the valve 17 is closed, and consequently the gas forming in the tube 15 through the heating effect cannot escape, but creates an ever increasing pressure within the container 2. Eventually the pressure within the container rises to such an extent that the diaphragm 20 will be pressed thereby down into the position shown in Fig. 2 of the drawing, the valve 17 thus opening to permit escape of gas into the burner 3, wherein the gas is ignited by the glow igniter 22, which has been heated in the meantime to ignition temperature. Through heat conduction from the burner 3, a sufficient quantity of heat is then supplied to the tube 15 to keep the vaporization in operation, permitting the electric heater to be now electrically disconnected. This is effected by means of the thermostat 23, when the temperature of the water in the space 5 has been raised a few degrees. The stove now continues to burn, until the fuel in the container 2 has been consumed or the vaporization ceases for some other reason, the diaphragm 20 then closing the valve 17 by reason of the reduction of pressure in the container 2 and the tendency of the diaphragm to normally assume an upwardly-arched position. Any residue of gas in the fuel container is then condensed through the cooling of the stove, a vacuum being thus formed, which sucks fuel through the conduit 10 and the valve 11, so that the container is filled again. When the temperature of the cooling water has fallen to an extent such that the thermostat is caused to close its contacts, the stove is ignited anew, the procedure described then repeating itself.

When the vehicle is to be taken into service and the stove is not called upon to burn any longer, the same may be extinguished by pulling the wire 14. The gas under super-atmospheric pressure will then flow through the valve 12 and the conduits 13, 10 back to the fuel tank of the vehicle, where it is condensed. By the drop in pressure the valve 17 closes while the stove is cut off, until the temperature of the cooling water falls again upon the termination of the use of the vehicle, the automatic heating then setting in to function again without any special measures.

To maintain the burning, when the glow igniter is disconnected, there may be provided a steatite member in the burner, said member being heated by the combustion to the ignition temperature of the gas and being thus capable of igniting the latter anew should the flame go out for some reason or other. If desired, the glow igniter may be incorporated into said steatite member.

Instead of causing the bottom of the fuel container to serve as the diaphragm controlling the valve in the burner nozzle, it is possible, in order to provide for more rapid functioning, to arrange an easily movable smaller diaphragm, which is preferably disposed in a special container.

In Figs. 3–6, the same reference numerals are made use of as in Fig. 2 for like or corresponding parts.

According to Fig. 4, the casing 1 encloses, in addition to a combustion space for the burner 3, an inner jacket 100, the intermediate space 102 between said inner jacket 100 and the casing 1 then forming a heating space for air which is introduced from the outside, that is to say from the atmosphere, through a conduit 104, said air then escaping through a conduit 106, which may be extended to the interior of the car, to the change speed gear box, or to the oil basin, or to any other place in the vehicle calling for heated air.

The casing 1 is provided at the bottom thereof with an air-intake 108, which is located at the lowermost point of the casing. Inserted into the air-intake is a wire netting or foraminous disk 110. The fuel container 2 is carried by a special perforated bottom 112 in an inner part 114 of the casing, which is provided at the top with transit holes 116 for air, so that air required for the combustion may flow from the air-intake 108 up into the space between the outer casing 1 and the inner casing 114 and through the holes 116 to the burner 3.

The water space of the heating apparatus is contained, according to Fig. 4, in a receptacle 118, which is arranged inside the jacket 100 above the burner 3. Cold water is supplied from the cooler through a conduit 6, and warm water escapes through a conduit 7. The water receptacle 118 is provided with heat-absorbing flanges 120 extending on the lower side thereof and upwardly on both sides in the space 122, which is arranged here between the jacket 100 and the wall of the receptacle. The intermediate space forms a passage for the combustion gases from the burner. A thermostat 23 is arranged in a pocket 124 in the receptacle 118.

Arranged in the path of the combustion gases, preferably above the water receptacle 118, is a perforated plate, wire netting 126 or the like, through which the combustion gases must pass on their way to an outlet. A part 130 of the casing 1 acting as an outlet chamber 128 for the combustion gases has a peripheral wall provided with a number of apertures 132, which form outlets for the combustion gases. A wire netting, perforated sheet-metal jacket 134 or the like extends about the peripheral wall, the combustion gases having to pass through said wire netting or the like when leaving the casing. The wire nettings or the like 110, 126 and 134 form flame screens ensuring that no flame will penetrate out of the casing should an explosion occur in the combustion space.

Arranged in the outlet conduit 7 extending from the water receptacle 118 is a safety valve 136, which opens should the pressure in the cooling water system become too high.

The fuel container 2 of the burner has a fuel outlet formed as a branch tube 138 with three branches, a first branch forming the inlet 10 from the fuel tank of the vehicle with the non-return valve 11 and a fuel filter 140 arranged therein, a second branch with the valve 12, which is opened at too high a pressure in the fuel container 2 or manually by means of the wire 14, and a third branch forming a filling socket 142 with a cover 144 for the filling of additional fuel into the container 2, said second branch being provided with an outlet socket 146, preferably directed downwardly, to lead off steam or liquid fuel admitted through the valve 12.

As will be seen from Fig. 5, the non-return valve 11 consists of a valve member 147, which is kept seated against a seat 149 by means of a spring 148. The excess pressure valve 12 comprises a diaphragm 150 from rubber or the like, which is stretched with a tightening fit at the circumference thereof between a shoulder 152 in the branch pipe socket 156 and the edge of a sleeve 154, which is screwed into the socket 156. The valve 12 is also associated with an operating member 158, which is pressed by a spring 160 against a diaphragm 150 at the center of the latter to keep it normally bearing with a tight fit against a protruding seat 152. A pulling wire 14 is connected with the operating member 158 by means of which wire the valve 12 can be opened manually. A threaded nipple 164 is provided to keep the branch pipe connected to the fuel container.

The valve rod 16 of the burner, which is provided with the cut-off valve 17 and the cleaning needle 19 in the fuel nozzle 18, is connected to a bellows 166 (Fig. 3), which is arranged within the fuel container 2 so as to be actuated by the pressure in the latter. The bellows 166 is carried by a yoke 168, which is screwed fast to the threaded lower end 170 of an inner pipe 172 having the rod 16 displaceably arranged within it. Secured to the bottom portion of the yoke is a rigid bridge 174, the bellows being secured to the latter. A leaf spring 176 having its ends extending into slots in the shanks of the yoke 168 is connected at the center with the valve rod 16 and with the bellows. Said spring 176 is adapted to cooperate with the bellows in such manner that at a certain compression of the bellows the spring will be brought with the middle portion thereof on a level with the ends thereof, whereupon the spring will rapidly curve downwardly to bring about a rapid compression of the bellows, whereby the cut-off valve 17 is caused to open completely. An evacuating pipe 177 extends from the bellows out through a stuffing box 178 in the bottom 180 of the fuel container.

Provided between the inner pipe 172 and an outer pipe 182 is an intermediate space 184 having a number of wicks 186 extending upwardly therein, said wicks being adapted to suck fuel from the lower portion of the container 2. The outer pipe 182 is surrounded by the electric heating helix 21, which is connected in series with the glow igniter 22 of the burner 3. The heating helix 21 and the pipes 172, 182 extend in a pocket 188 depending from the top of the fuel container and having the outer pipe 182 screwed into the bottom thereof.

As shown in Fig. 6, the heating helix 21 and the glow igniter 22 are connected into a circuit in series with the thermostat 23, a time switch 190 and a source of current consisting generally of the storage battery F of the vehicle. The time switch is adapted to interrupt the circuit after a certain maximum time should normal starting of the burner have failed by reason of functioning faults. The thermostat 23 may be shunted through a switch 191, by means of which the burner may be started manually, if desired.

The mode of operation of the embodiment now described is with respect to the automatic ignition of the burner and the extinction thereof broadly the same as that described relative to the embodiment according to Fig. 2. The bellows 166 and the spring 176 act together as the bottom 20, but facilitate a more rapid and safer adjustment of the cut-off valve 17 from closed into open position and vice versa. An effective supply of fuel to the burner is ensured even if fuel is to be found only in the lower part of the fuel container, a feature which is ascribed to the wicks 186. By the fact that the air-intake is arranged in the lowermost part of the casing 1, the risk is obviated that fuel vapors existing, per chance, in the combustion space upon the extinction of the burner remain in the casing. If on being cooled they should sink down toward the bottom of the casing, they can easily escape from the latter through the air-intake 108. The flame nettings 110, 126 and 134 obviate burns should any explosion occur.

A special advantage of the embodiment shown in Fig. 4 is that it facilitates heating not only of the cooling liquid but also of air, which may be used for varying purposes, particularly for the heating of the passenger space in a motor vehicle. Cold air entering through the conduit 104 is understood to pass round the jacket 100, which is heated by the combustion gases flowing upwardly from the burner, said air being thus heated on its way through the space 102 to the outlet conduit 106. A suitable fan may be provided, for instance in the conduit 106, for the propulsion of the air.

The invention is not limited to the examples of embodiment shown. As a modification it might be mentioned that in place of the non-return valve 11 the provision of an electromagnetic valve is feasible, this valve being controlled by a thermostat sensitive to the temperature of the cooling liquid, in a manner such that it will close the fuel supply when the burner is started, and will open the fuel supply when the higher temperature has been attained in the cooling liquid, at which temperature continued heating is not desirable. Alternately, the electromagnetic valve may be arranged as a supplement to the non-return valve 11 and be shunted to the latter valve in the fuel inlet to the fuel container of the stove. The electromagnetic valve may be constructed in the manner described in my U. S. patent application No. 121,958, filed on October 18, 1949, now Patent No. 2,623,511, dated December 30, 1952.

What I claim is:

1. A stove for liquid fuel comprising a heating device including a vaporization chamber having an inlet for liquid fuel and an outlet for vaporized fuel, a discharge valve interposed between the interior of the chamber and the outlet and adapted to permit escape of the vaporized fuel through the outlet from the chamber only after the reaching of a predetermined pressure therein, means for producing pressure within the chamber consisting of a fuel passage having a portion disposed within the chamber and which is adapted to be heated to form gas within it, and a non-return valve interposed between the chamber and a fuel supply and adapted to open the inlet for supply of the liquid fuel to the chamber after reduction of the pressure therein below a predetermined level.

2. A stove as claimed in claim 1, in which the heating device includes a gas burner, the fuel passage being in the form of a riser tube having the portion arranged within the chamber and having another part rising from the chamber and disposed outside of the same, and means encircling said riser tube externally of the chamber for heating said tube.

3. A stove for motor vehicles comprising, a fuel container comprising a vaporization chamber, a gas burner, a riser tube extending between the fuel container and gas burner, for conveying fuel from said fuel container to the gas burner, an electric heating helix surrounding the riser tube and adapted to be connected to the storage battery of a motor vehicle, an inlet valve connected to the fuel container for permitting the entry of liquid fuel thereto, a discharge valve adapted to permit the flow of vaporized fuel through the riser tube to reach the burner when predetermined pressure is attained within the fuel container, the riser tube having a portion disposed within the fuel container and adapted, when heated by said helix, to create pressure within the fuel container, and said inlet valve being a non-return valve operative to open the inlet for the supply of the liquid fuel to the container after reduction of pressure therein below a predetermined level.

4. A stove for heating motor vehicles comprising, a fuel container having a fuel inlet, a riser tube extending from the fuel container, a burner mounted on said riser tube, said riser tube having a portion located within the container and forming together therewith a vaporization chamber, said riser tube forming a passage for vaporized fuel from the interior of the container to the burner, a heating coil arranged around the riser tube externally of the container to heat the riser tube and to create gas pressure within the container, a discharge valve operative within the riser tube for permitting the flow of fuel therethrough to the burner only after predetermined gas pressure is reached in the fuel container, a non-return valve for controlling the fuel inlet, said non-return valve being operative to open after a pressure drop in the container below a predetermined level.

5. A stove as provided for in claim 4, including an electric glow ignition device connected in series with the heating coil, and a thermostat for automatically cutting off the heating coil and ignition device after ignition of the burner by said ignition device.

6. A stove as provided for in claim 4, wherein the discharge valve is in the form of a rod extending through the riser tube, a seat in said tube for one end of the rod when the same is in a closed position, the bottom of the container being in the form of a resilient diaphragm, one end of the rod being attached thereto, said diaphragm being caused to be flexed in one direction by pressure within the fuel container to thereby open the valve.

References Cited in the file of this patent

UNITED STATES PATENTS

| | | |
|---|---|---|
| 1,022,048 | Von Post | Apr. 2, 1912 |
| 1,249,644 | Lukaszewski | Dec. 11, 1917 |
| 1,529,906 | Morris | Mar. 17, 1925 |
| 1,686,887 | Van Hise | Oct. 9, 1928 |
| 2,021,569 | Pasco | Nov. 19, 1935 |
| 2,074,168 | Danuser | Mar. 16, 1937 |
| 2,388,969 | Hess et al. | Nov. 13, 1945 |
| 2,393,411 | Resek | Jan. 22, 1946 |
| 2,507,113 | Marshall | May 9, 1950 |
| 2,553,817 | Kleen | May 22, 1951 |
| 2,616,412 | Backus | Nov. 4, 1952 |
| 2,621,718 | Krautter et al. | Dec. 16, 1952 |